UNITED STATES PATENT OFFICE.

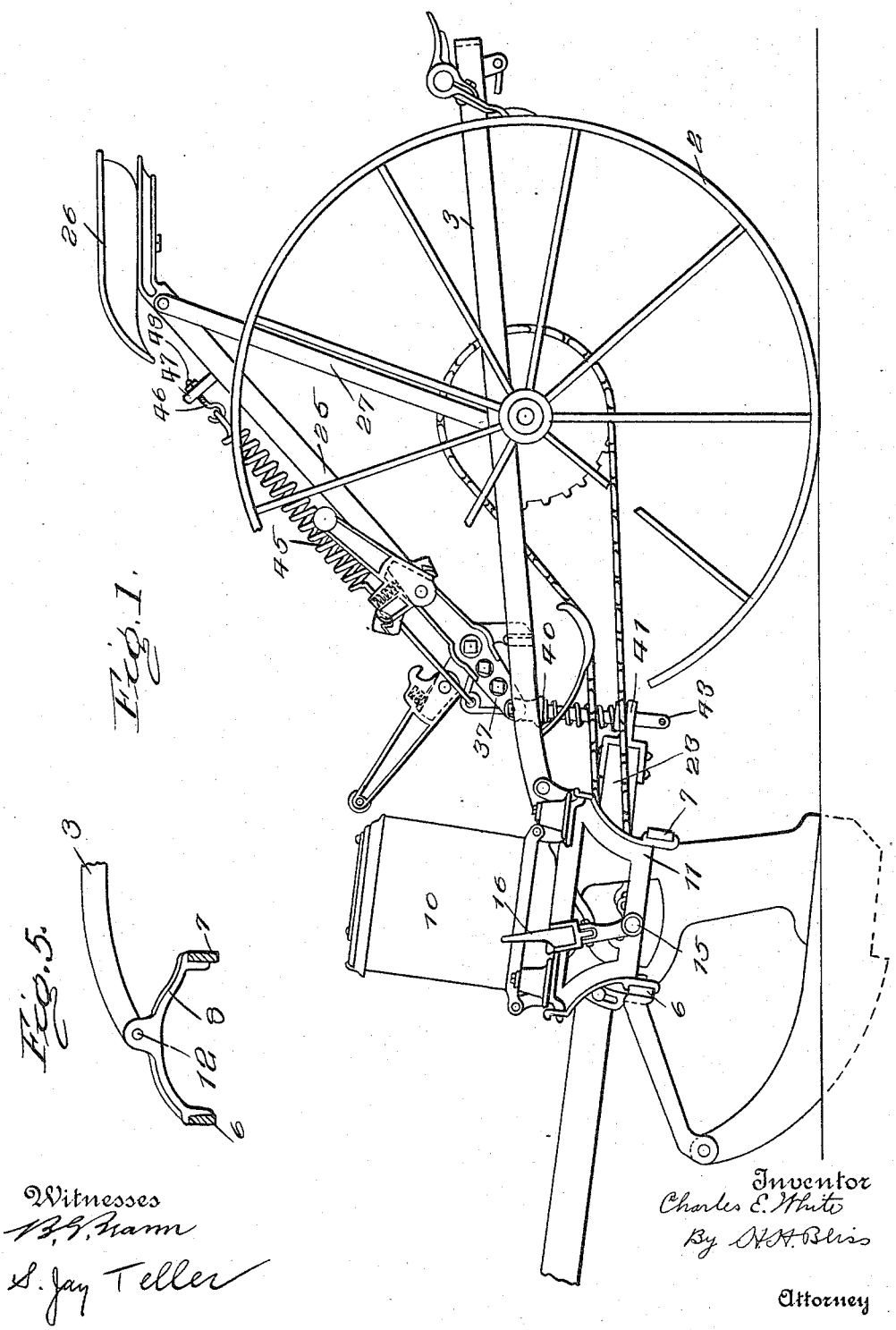

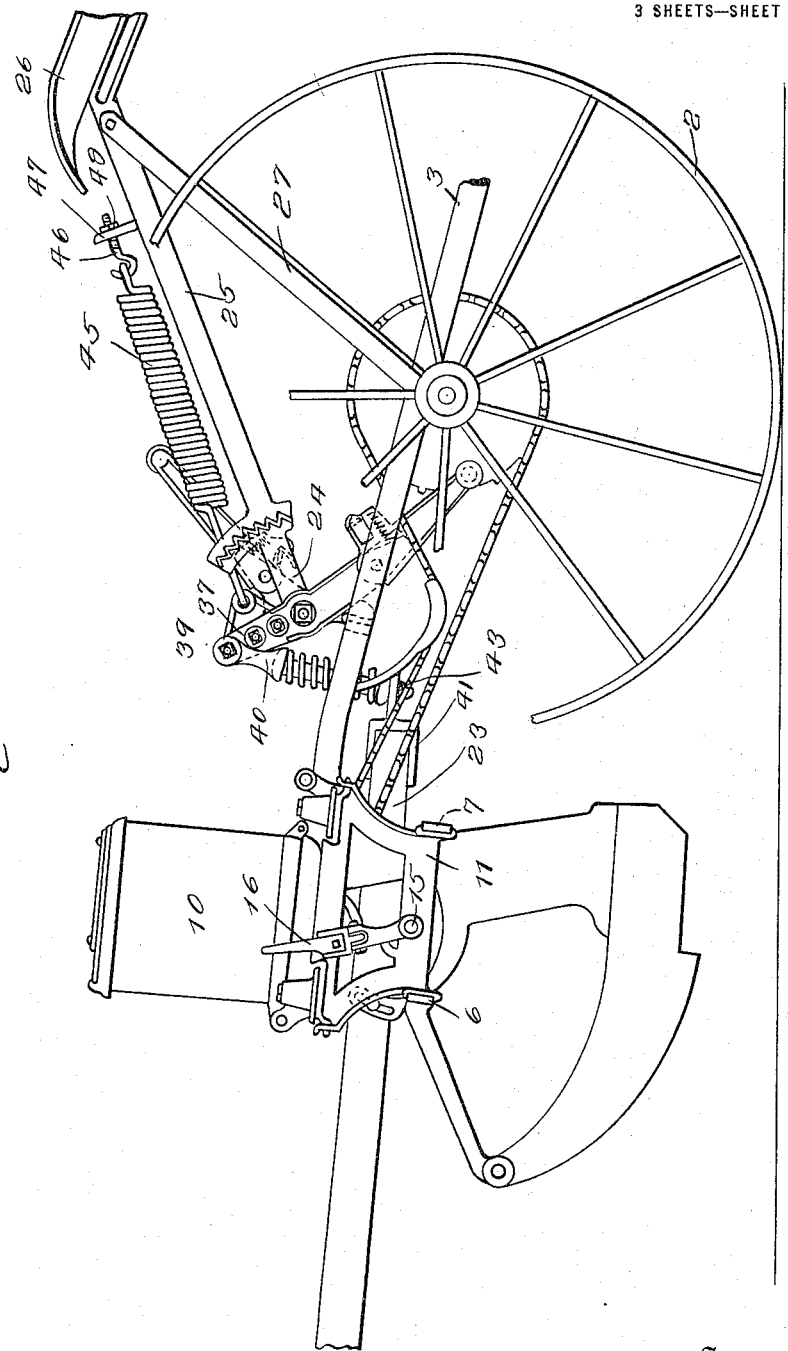

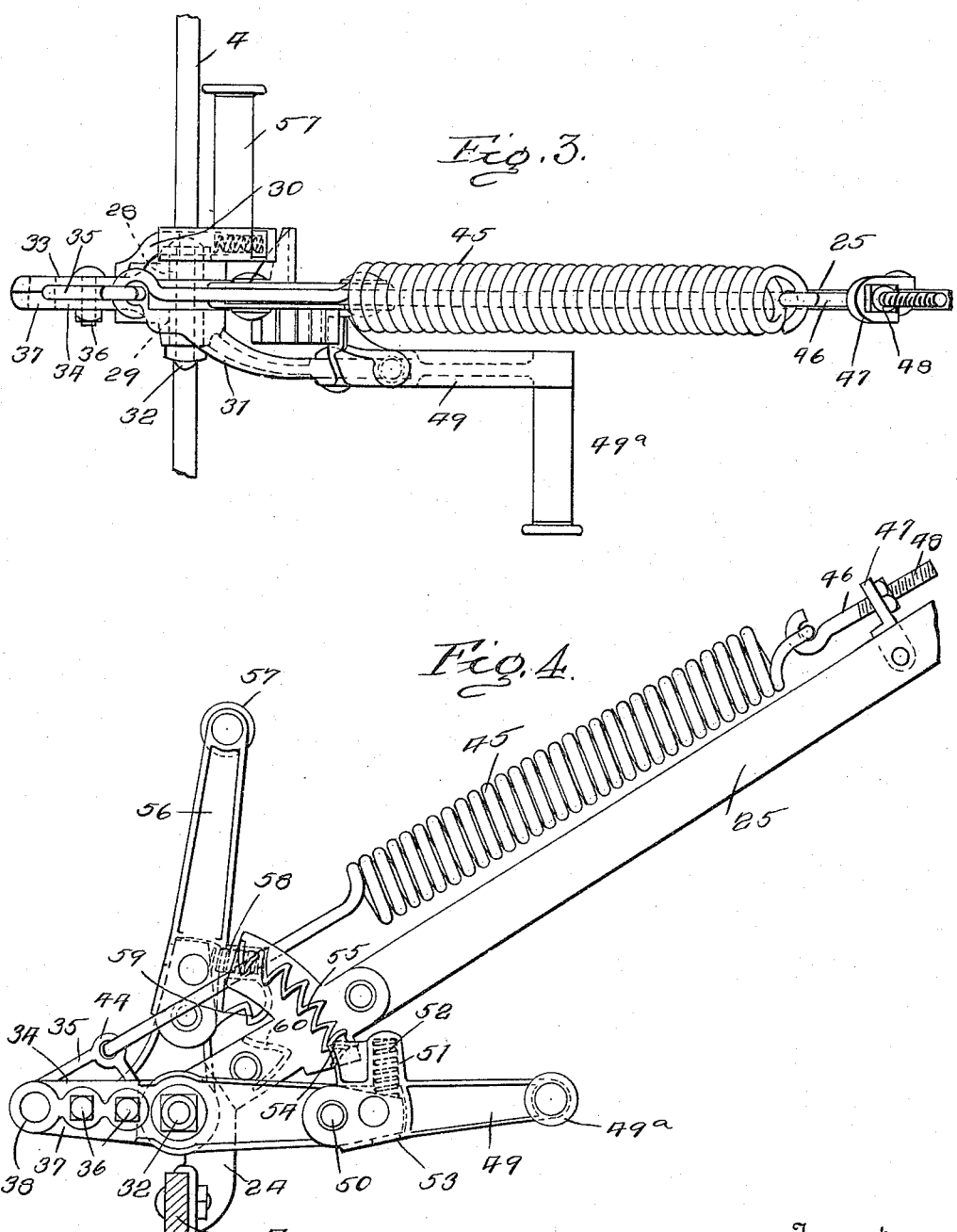

CHARLES E. WHITE, OF MOLINE, ILLINOIS, ASSIGNOR TO DEERE & MANSUR CO., A CORPORATION OF ILLINOIS.

TOOL-SHIFTING MECHANISM FOR AGRICULTURAL IMPLEMENTS.

1,156,384.     Specification of Letters Patent.     Patented Oct. 12, 1915.

Application filed November 10, 1910. Serial No. 591,647.

*To all whom it may concern:*

Be it known that I, CHARLES E. WHITE, a citizen of the United States, residing at Moline, in the county of Rock Island and State of Illinois, have invented certain new and useful Improvements in Tool-Shifting Mechanism for Agricultural Implements, of which the following is a specification, reference being had therein to the accompanying drawing.

This invention relates to improvements in planters and other agricultural implements which are similar thereto as concerns the frames which adjust and support the tools.

The improvements are particularly applicable to corn planters of the "hinged frame" type, now commonly in use. Each is usually made with a vertically vibratable main frame mounted at the axis of two ground wheels around which it vibrates, and a supplemental tool-carrying, or runner, frame in front, hinged to the main frame, and also supplementally joined thereto by flexible connecting devices.

The object of the invention is to provide an improved foot lever mechanism, by means of which the driver shall be able to vibrate, vertically, the two frames, and carry them from those positions where the runner or tool frame is held entirely out of operation, down to the lowermost working position; also able to place them at either of several working positions; and to lock them, optionally, in any desired working position; and also release the locking mechanism at any time; all to be done by means of his feet, which can remain permanently in position upon the foot rests of the levers.

For a typical illustration of a farm implement embodying my improvements, I have selected a corn planter, and the several illustrations thereof, or its parts, are as follows:

Figure 1 is a left side elevation with the front frame and planting mechanism in operative position. Fig. 2 is a view similar to that of Fig. 1 but with the planting mechanism raised to inoperative position. Fig. 3 is a detail plan view on an enlarged scale of the lever mechanism. Fig. 4 is a left side elevation of the lever mechanism. Fig. 5 is a fragmentary vertical section showing the pivotal connection between the main frame and the front frame.

Referring to the parts of the implement shown in the drawings (which, as stated, is a corn planter, and here selected for illustration) 3, 4 indicate the bars of a main frame resting on the axle 1. This frame is adapted to vibrate vertically around the axis of the wheels from the position shown in Fig. 1 to that shown in Fig. 2. The tool-carrying frame, in this case a planter runner frame, comprises the bars 6 and 7, and cross bars or braces 8, and has the draft tongue 23 rigidly connected thereto. It supports the runners, the seed receptacles 10, the check head frames 11, and the tappet-actuated mechanism at 16. The tool, or runner, frame is pivotally connected at a transverse horizontal axis to the rear or wheel frame and is also vertically vibratable from the position shown in Fig. 1 to that shown in Fig. 2. The adjacent parts of the two frames move together vertically, the front or tool frame moving around an approximately fixed center at the neck yoke while the rear frame moves, as stated, around the axis of the ground wheels. There is also a flexible connection between the frames comprising parts to be referred to below.

In the operating of farm implements, such as corn planters, it is desirable that the driver should be left entirely free to use both hands for the control of the team, both in driving across the field, in paying attention to the checking mechanism, in adjusting the frames immediately prior to turning at the ends of the rows, respectively, and in again adjusting them, after turning, for working.

It has been proposed, at earlier times, to provide planters with parts supposed to be capable of attaining these purposes. But I do not at present have knowledge of any mechanism employed in such implements which permitted the operator to maintain his hands permanently free from levers and enabled him to effect all the above movements of the frames and of the tools, relatively to each other, by means of his feet, which, respectively, are allowed to remain permanently in one position as concerns their contact with the elements of the lever system.

I will now describe the lever mechanism to which this invention more particularly relates.

It is important that suitable means be provided for adjusting the planting mechanism to plant at various depths and for lifting the mechanism to an inoperative position at the ends of the rows, and for the purpose of transporting the machine from place to place. In planters as usually constructed, this adjustment has been effected by means of a hand lever, and in some cases, foot levers have been used in connection with the hand lever. In my improved construction, however, the hand lever is entirely omitted, and the frames are controlled entirely by foot levers. And this foot lever system has its parts so arranged that two foot rests, or foot-engaging parts, are sufficient to accomplish all the desired ends of raising the tools to their highest inoperative position; locking them there; lowering them to their lowermost operative position, and locking the frames together in a position corresponding thereto; adjusting the frames to several intermediate operative positions, and locking them therein respectively, and optionally; all performed without requiring the removal of either foot by the operator from its rest or pedal in the lever system.

As has been previously stated, the front frame of the machine is pivoted at 12 to the side bars 3 of the main wheel frame. The tongue 23 is rigidly secured to the front frame and has its rear end extending to a point adjacent the cross bar 4 of the wheel frame. To the cross bar 4 is secured a casing or bracket 24 to which is bolted or riveted the upward and rearward extending bar 25 upon the upper end of which is mounted the driver's seat 26. The bar 25 and the seat 26 are suitably supported and braced by means of bars 27 which extend from the seat downward and outward to the side bars 3, of the main frame.

The bracket 24 is provided at each side with laterally and horizontally extending bearing bosses 28 and 29. 30 and 31 are lever arms pivoted respectively on the bosses 28 and 29. They are held in place by means of the through bolt 32. The lever arms 30 and 31 are provided with forward extensions 33 and 34, between which is mounted the bracket 35. Bolts 36 pass through the extensions 33 and 34 and the bracket 35, and serve to unite them into one unitary arm which is designated as a whole by 37. At the forward end of the arm 37 is an aperture 38 through which passes a bolt 39 which serves as a pivot for the forked link 40. This link has its lower end extending through a bracket 41 on the rear end of the tongue.

42 is a coiled spring interposed between the upper end of the link and the bracket 41.

43 is a cotter pin in the lower end of the link 40 and serves to prevent the withdrawal of the link from the bracket 41.

The bracket 35 is provided with an eye 44.

45 is a coiled spring engaging at its lower end with the eye 44 and at its upper end with an adjusting screw 46 which passes through a bracket 47 attached to the bar 25 near its upper end. By means of the nut 48 on the screw 46, the tension of the spring 45 may be adjusted. It will be noted that the action of the spring 45 tends to lift the forward frame of the machine.

It will be noted that the lever arm 21 lies in substantially the same plane with the arm 37. At the rear end of the arm 31 is a foot lever 49 which is connected to the arm by means of a pivot pin 50. This foot lever is provided at its rear end with a foot rest 49$^a$. The lever 49 is provided with a socket which is adapted to receive the tapered rear end of the arm 31. This construction permits a certain amount of lost motion between the lever 49 and the arm 31.

A pocket 51 is provided at the side of the socket in the lever 49, and in this pocket 51 is located a coiled spring 52 which engages with the rear end of the arm 31. An aperture 53 in the opposite side of the socket permits the insertion of the spring in assembling. It will be noted that the action of the spring tends to lift the lever into its upper position relative to the arm.

The lever 49 is provided with a locking hook or catch 54 which is adapted to engage with suitable notches 55 formed at the side of the bracket 24.

The arm 30 extends upward in a plane substantially at right angles to the plane of the arm 37. At the upper end of this arm is a foot lever 56 similar to the lever 49 and having a foot rest 57. It is similarly connected to the arm 30 and the spring 58 tends to normally hold it in its rearmost position relative to the arm 30. The lever 56 is provided with a locking hook or catch 59 which is adapted to engage with a locking lug 60 formed at the side of the breacket 24.

It will be noted that a pressure of the driver's foot on either of the foot rests 49$^a$ or 57 will not only unlock the lever from the lug or notch with which it may be engaged, but will also adjust the positions of the planter frames. In operation simultaneous pressure on both of the foot rests will entirely unlock the lever system and permit the free movement of the frames. The frames can be adjusted for any desired depth of planting, and when this adjustment has been reached, the removal of pressure from the foot rest 49$^a$ will permit the automatic engagement of the catch 54 with one of the notches 55.

When it is desired to lift the runners to inoperative position, as shown in Fig. 2, either for transportation of the machine from place to place, or at the end of the row to permit turning the machine, a simple pressure on the foot rest 49$^a$ will not only unlock the two frames, but will also move the forward frame to lift the planting mechanisms. When the forward frame has been lifted, it will be locked in position by the automatic engagement of the hook 59 with the lug 60. When it is desired to again move the planting mechanisms into operative position, a pressure on the foot rest 57 will unlock the frames and will also serve to force the furrow openers into the ground. This downward movement of the forward frame may of course be retarded or controlled by means of the other foot lever, and when the proper position has been reached, the hook 54 will automatically engage the proper notch 55. With a very little practice, the driver will be able to determine which notch the hook 54 should engage with for the proper depth of planting under a given set of conditions, and will be able to quickly bring the mechanism into this position.

The seat is so positioned that the weight of the driver can be utilized to coöperate with the levers in effecting the movements of the frames, and the levers are so positioned in respect to the vibrating frame and to the seat, that the operator, when his weight is exerting its utmost efficiency, shall have the least lever work to perform, it being merely necessary to release, with a slight foot movement, the lever 57, for thereupon the gravity of the tool frame and of the forward parts of the main frame begin to cause a downward movement of the hinge axis. As the driver's seat comes forward he has an increasingly heavier abutment against which to thrust when pressing the tools into the ground. And the parts are so related that when the driver desires to lift the frames his lifting foot is in such position relative to the seat, to the vibrating main frame, and to the axis of the lever system that he can readily throw his weight upon this foot-lever and effect such raising. As the rising of the overlapping parts of the frames continues, the lifting foot-lever descends under the driver's thrust and, as shown in Fig. 2, all of the parts shift their relative positions in such way that both the weight of the driver, the spring and the foot lever mutually assist each other in bringing the heavy front frame bodily up to its highest position.

The space between the driver and the team is free of projections, such as hand-levers, and all of the parts are so situated that he is left free to control the locking, the unlocking, the lowering, the adjusting and the lifting, of the frames by his feet without moving them, respectively, from the rests or pedals upon which they are initially placed.

The natural movements of the driver's feet while he is in his seat are in vertical planes, that is, forward and back or upward and down, and as the lever system, including the parts 37, 49, and 56, as a whole, moves in vertical planes, the connection interposed between that system and the tool, or runner, frame can be made directly by such flexible union devices as those at 40, 41 and 43, to the front frame without requiring any intervening, translating or direction-changing devices.

As the main frame rises or falls, the lever system rises or falls with it; but inasmuch as the driver applies the power, in one direction or the other, to this lever system at one or the other of only two points, provided for his feet, these points can be held substantially constant, in relation to the driver, notwithstanding the frequent movements of the frames.

The two sets of locking devices, those at 59, 60, on the one hand, and those at 54, 55, on the other, are independent of each other. One is released by one of the levers when moving in one direction, and the other by the other lever when moving in the opposite direction.

The tension of the spring 45 should be adjusted so as to largely compensate for the tendency of the forward frame to move downward under the action of gravity. With the spring 45 properly adjusted, the adjustment and control of the planter may be effected with very little effort on the part of the driver.

What I claim is:—

1. In a mechanism for shifting vertically, and locking, the earth-working tools of agricultural implements, the combination of a rear wheel-mounted frame carrying a seat and a front tool-carrying frame pivoted together and vibrating vertically in opposite directions, around an axis normally movable downward under the gravity of the frames, a vertically vibratable foot-lever system carried by the main frame and movable bodily vertically therewith and flexibly connected to the tool-carrying frame for lifting, lowering and adjusting the latter, two independent sets of locking devices, one of said sets locking the frames in their uppermost positions only, and two power-applying lever-like devices in said system, respectively accessible to the feet of the driver, one for both unlocking said system and pushing down the tools into the earth and the other for both unlocking said system and elevating both the frames to inoperative positions.

2. In a mechanism for shifting, vertically, and locking, the earth-working tools of agricultural implements, the combination of a rear wheel-mounted frame carrying a driver's seat and a front tool-carrying frame pivoted together and vibrating in opposite directions, on an axis normally free to move downward at all working points of the frames, a foot lever system carried by the main frame and flexibly connected to the tool-carrying frame for lifting, lowering and adjusting the latter, two independent sets of locking devices, one for holding the frames locked in one relation only, to wit, when in their uppermost positions, and the other for holding them against displacement in one direction from either of several positions corresponding to working positions of the tools, and two power-applying lever-like devices in said system respectively accessible to the feet of the driver while in said seat, one for releasing the first said lock and permitting the tool frame to be lowered to either of several working positions, and the other for releasing the second aforesaid lock and elevating both the frames to their uppermost inoperative positions.

In testimony whereof I affix my signature, in presence of two witnesses.

CHARLES E. WHITE.

Witnesses:
 OSCAR F. LUNDAHL,
 ROBERT M. ADAMS.